(12) United States Patent
Uchinuno et al.

(10) Patent No.: US 8,363,168 B2
(45) Date of Patent: Jan. 29, 2013

(54) SIGNAL PROCESSING APPARATUS AND SIGNAL PROCESSING METHOD PERFORMING GAMMA CORRECTION

(75) Inventors: Shinji Uchinuno, Kanagawa (JP); Fuminori Higashi, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1161 days.

(21) Appl. No.: 12/222,780

(22) Filed: Aug. 15, 2008

(65) Prior Publication Data

US 2009/0086102 A1    Apr. 2, 2009

(30) Foreign Application Priority Data

Sep. 27, 2007 (JP) ................................. 2007-251270

(51) Int. Cl.
    *H04N 5/202*      (2006.01)

(52) U.S. Cl. ........................................ 348/674; 348/254

(58) Field of Classification Search .................. 348/674, 348/254
See application file for complete search history.

(56) References Cited

U.S. PATENT DOCUMENTS

| | | | | |
|---|---|---|---|---|
| 4,393,398 | A * | 7/1983 | Horiguchi et al. | 358/527 |
| 5,008,752 | A * | 4/1991 | Van Nostrand | 348/581 |
| 5,963,714 | A * | 10/1999 | Bhattacharjya et al. | 358/1.9 |
| 6,606,093 | B1 * | 8/2003 | Gossett et al. | 345/441 |
| 6,714,210 | B1 * | 3/2004 | Yip et al. | 345/667 |
| 6,768,817 | B1 * | 7/2004 | Cheng et al. | 382/232 |
| 6,929,712 | B2 | 8/2005 | Hanazaki et al. | |
| 7,527,016 | B2 | 5/2009 | Yamazawa et al. | |
| 7,667,777 | B2 * | 2/2010 | Lee | 348/687 |
| 7,839,418 | B2 * | 11/2010 | Kwon | 345/604 |
| 7,940,334 | B2 * | 5/2011 | Tang et al. | 348/674 |
| 8,094,238 | B2 * | 1/2012 | Tagami | 348/674 |
| 2003/0231366 | A1 * | 12/2003 | Lin | 358/519 |
| 2004/0075674 | A1 * | 4/2004 | Bu | 345/690 |
| 2004/0118344 | A1 | 6/2004 | Ni et al. | |
| 2005/0088385 | A1 * | 4/2005 | Elliott et al. | 345/87 |
| 2005/0253784 | A1 * | 11/2005 | De Greef et al. | 345/63 |
| 2006/0152597 | A1 * | 7/2006 | Shimizu | 348/222.1 |

(Continued)

FOREIGN PATENT DOCUMENTS

| | | |
|---|---|---|
| CN | 1874410 A | 12/2006 |
| JP | 3-213064 | 9/1991 |

(Continued)

OTHER PUBLICATIONS

Chinese Office Action dated Apr. 20, 2011, with English translation.

(Continued)

*Primary Examiner* — Pankaj Kumar
*Assistant Examiner* — Mulugeta Mengesha
(74) *Attorney, Agent, or Firm* — McGinn IP Law Group, PLLC

(57) ABSTRACT

A difference sample data holder of a gamma correction device holds as difference sample data a difference between a corrected signal level and a yet-to-be-corrected signal level for each of multiple sample points set at equal intervals between the permissible minimum and maximum levels of an input video signal. A correction execution unit performs cubic interpolation operation using the difference sample data held in the difference sample data holder, and adds the operated result and the signal level of the input video signal to obtain the signal level of the corrected video signal.

8 Claims, 7 Drawing Sheets

U.S. PATENT DOCUMENTS

| | | | |
|---|---|---|---|
| 2006/0274386 A1* | 12/2006 | Wakazono et al. | 358/518 |
| 2007/0222729 A1* | 9/2007 | Nishiyama et al. | 345/88 |
| 2008/0278420 A1* | 11/2008 | Chang | 345/77 |
| 2009/0251596 A1* | 10/2009 | Tagami | 348/441 |

FOREIGN PATENT DOCUMENTS

| | | |
|---|---|---|
| JP | 7-115566 A | 5/1995 |
| JP | 10-313418 | 11/1998 |
| JP | 10-321598 | 12/1998 |
| JP | 2003-282542 A | 10/2003 |
| JP | 2004-140702 | 5/2004 |
| JP | 2004-140702 A | 5/2004 |
| JP | 2004-228460 A | 8/2004 |
| JP | 2006-511059 A | 3/2006 |

OTHER PUBLICATIONS

Notification of Reasons for Refusal dated Feb. 7, 2012 (with an English translation).

Japanese Office Action dated Sep. 25, 2012 with an English translation thereof.

\* cited by examiner

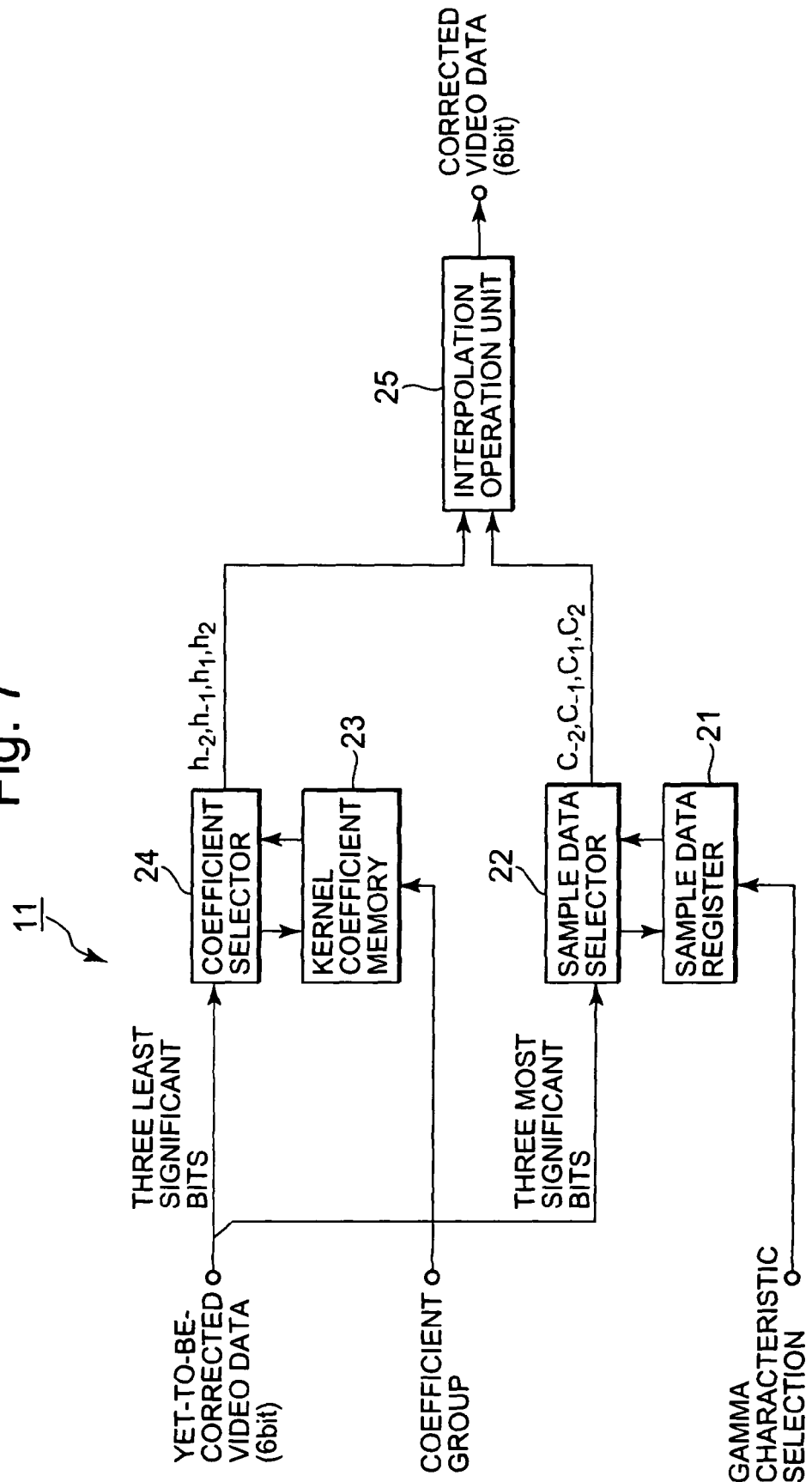

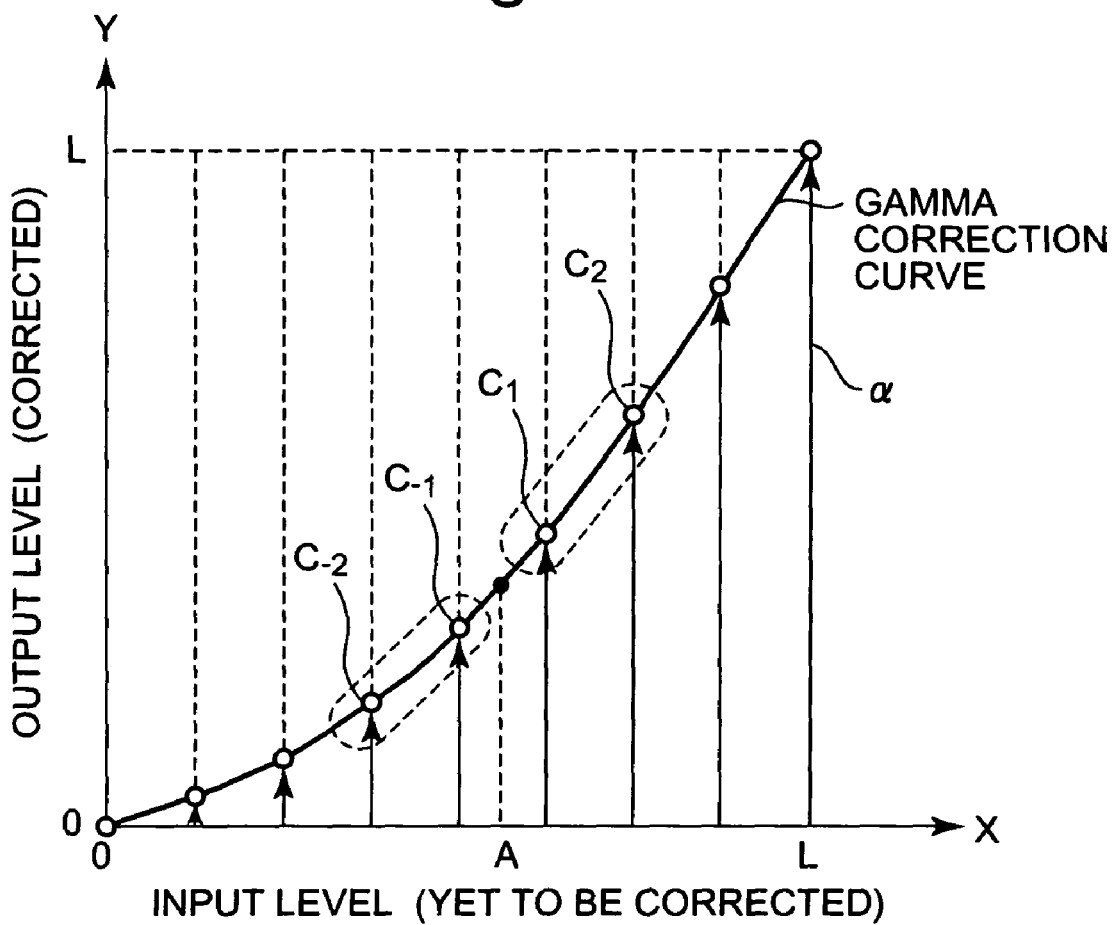

ND VIDEO DISPLAY DEVICES to display a video signal,
SIGNAL PROCESSING APPARATUS AND SIGNAL PROCESSING METHOD PERFORMING GAMMA CORRECTION

BACKGROUND OF THE INVENTION

1. Field of the Invention

The present invention relates to signal processing, and more specifically, to signal processing techniques for gamma correction on an input video signal.

2. Description of Related Art

In order for a video display device to display a video signal, gamma correction is performed on the video signal so that the gamma characteristic of the video signal can match that of the video display device, since video display devices are of varying gamma characteristics according to the types of video display devices. For example, assuming that an available display is a Braun tube (CRT) display, the present television broadcasting is subjected, at the transmitting end, to the gamma correction for the gamma characteristic of CRT displays.

On the other hand, there has recently been an increasing variety of video display devices, and a liquid crystal display (LCD), a plasma display panel (PDP) and the like are also becoming widespread in addition to the CRT display. When a video display device other than the CRT display, such as the LCD or the PDP, displays a video signal for the present television broadcasting, it is required that the video signal be subjected to a process for undoing the gamma correction performed on the video signal at the transmitting end, and for matching the gamma characteristic of the video signal with that of the video display device in use.

The process for undoing the gamma correction performed previously on the video signal, which is also called "inverse gamma correction," is essentially equivalent to the gamma correction in that the process is to change the gamma characteristic of the video signal. The process for changing the gamma characteristic of the video signal is herein referred to generally as "gamma correction" regardless of whether it is the gamma correction or the inverse gamma correction, unless otherwise specified.

The gamma correction is performed based on a gamma correction curve. For example, a lookup table (LUT) is created by including description of conversion data based on the gamma correction curve, and prestored in a storage device such as a ROM (read only memory). Then, the gamma correction is performed by using this LUT.

However, the high accuracy of approximation to the gamma correction curve is required so that a video can be displayed as clear and natural as possible. This requires such an enormous amount of data in the LUT that the storage device that stores the LUT should have a large capacity and that a gamma correction device should also have a large circuit scale. In particular, if it is necessary to support multiple video display devices of different gamma characteristics, the same number of LUTs as the number of types of video display devices is required, so that this problem becomes more noticeable.

Japanese Patent Laid open application No. 2004-140702 discloses an approach for suppressing the circuit scale increase of the gamma correction device. This approach involves: first setting multiple sample points by equally dividing a video signal between its minimum and maximum signal levels; and holding a yet-to-be-corrected signal level and a corrected signal level (sample data) in association with each other on each of the sample points. Assuming that the yet-to-be-corrected signal level and the corrected signal level are represented by values on the X axis and Y axis, respectively, the points indicated by the coordinates (the signal levels at the sample points, and the sample data) are located on the gamma correction curve. This approach uses the data previously held in this manner for cubic interpolation correction to thereby obtain the corrected signal level corresponding to the signal level of the input video signal.

FIG. 7 shows structural components, shown as functions in FIG. 5 of the Patent Literature, indicated as devices for sake of simplicity. As shown in FIG. 7, a gamma correction device 11 includes a sample data register 21 that stores sample data, a sample data selector 22, a kernel coefficient memory 23, a coefficient selector 24, and an interpolation operation unit 25.

The interpolation operation unit 25 performs cubic interpolation operation based on a third-order polynomial equation called "a kernel function", and uses sample data fed from the sample data selector 22 and coefficients (namely, kernel coefficients) fed from the coefficient selector 24 in order to perform the interpolation operation.

The sample data selector 22 selects sample data required for the interpolation operation according to the signal level of an input video signal, and supplies the sample data to the interpolation operation unit 25. In the example of the gamma correction device 11 shown in FIG. 7, sample data at each two sample points on the right and left sides of the level of the input video signal on the X axis are selected.

The coefficient selector 24 obtains distances (level differences) between the level of the input video signal and sample points of four sample data selected by the sample data selector 22, reads out kernel coefficients for the obtained level differences from the kernel coefficient memory 23 and outputs the kernel coefficients to the interpolation operation unit 25.

The interpolation operation unit 25 performs weighting addition on the four sample data from the sample data selector 22 while using as weighting coefficients the four kernel coefficients from the coefficient selector 24, to thereby obtain the signal level of the gamma-corrected input video signal.

This approach enables the gamma correction using a configuration with a small-scale circuit or with a small amount of operation instead of using a large-scale LUT or performing higher-order operation.

SUMMARY OF THE INVENTION

Discussion will now be made with reference to FIG. 8 as to the capacity of the sample data register 21 of the gamma correction device 11 shown in FIG. 7.

In FIG. 8, the horizontal axis X indicates the signal level before gamma correction (hereinafter referred to as an "input level"), and the vertical axis Y indicates the signal level after the gamma correction (hereinafter referred to as an "output level"). In FIG. 8, as for white circles located on the gamma correction curve, the X value represents the signal level at the sample point, and the Y value represents sample data. Also, as for black circles located on the gamma correction curve, the X value represents the level of the input video signal, and the Y value represents the output level obtained by performing interpolation operation on the level of the input video signal.

To determine the output level for one input level, four sample data are used. Four white circles surrounded by dotted lines in FIG. 8 represent sample data selected for obtaining the output level at the signal level A.

If the maximum value of the input level and the output level of the video signal is set to L, then it is required that a cover range of the sample data be set to be 0 to L as shown by an arrow α in FIG. 8. Thus, the bit width N of the sample data needs to be equal to or more than "log2 (L+1)," and the sample data register 21 storing the sample data needs to have registers, the number of which corresponds to the bit width of "N×the number m of sample points."

If the capacity required for the sample data register that stores the sample data is large, then this causes a problem that the effect of suppressing the circuit scale increase with the technique disclosed in Patent Literature 1 is lessened.

Also, the interpolation operation unit 25 that performs weighting addition on the four sample data requires four multipliers that perform operation of "sample data×weighting coefficients," and three adders that add the multiplied results of the multipliers. If the bit width of the sample data is large, then this causes a problem that the circuit scale of the multipliers and the adders becomes large.

One exemplary aspect of the present invention is a video signal processing apparatus for performing gamma correction on an input video signal. The video signal processing apparatus includes a sample data holder and a correction execution unit.

The sample data holder holds as difference sample data a difference between a corrected signal level and a yet-to-be-corrected signal level for each of multiple sample points set at equal intervals between the permissible minimum and maximum levels of the input video signal.

The correction execution unit performs cubic interpolation operation using the difference sample data held in the difference sample data holder, and adds the operated result and the signal level of the input video signal to obtain the signal level of the corrected video signal.

Note that, the above-mentioned apparatus as implemented as a method, a system, or a program for causing a computer to operate as the above apparatus is also effective as an aspect of the present invention.

The technique according to the present invention enables high-accuracy gamma correction on the video signal while surely suppressing the circuit scale increase.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 7 is a view showing a gamma correction device 11 of a related art; and

FIG. 8 is a graph for explaining processing by the gamma correction device 11 shown in FIG. 7.

DETAILED DESCRIPTION OF THE EXEMPLARY EMBODIMENTS

Figure 1:
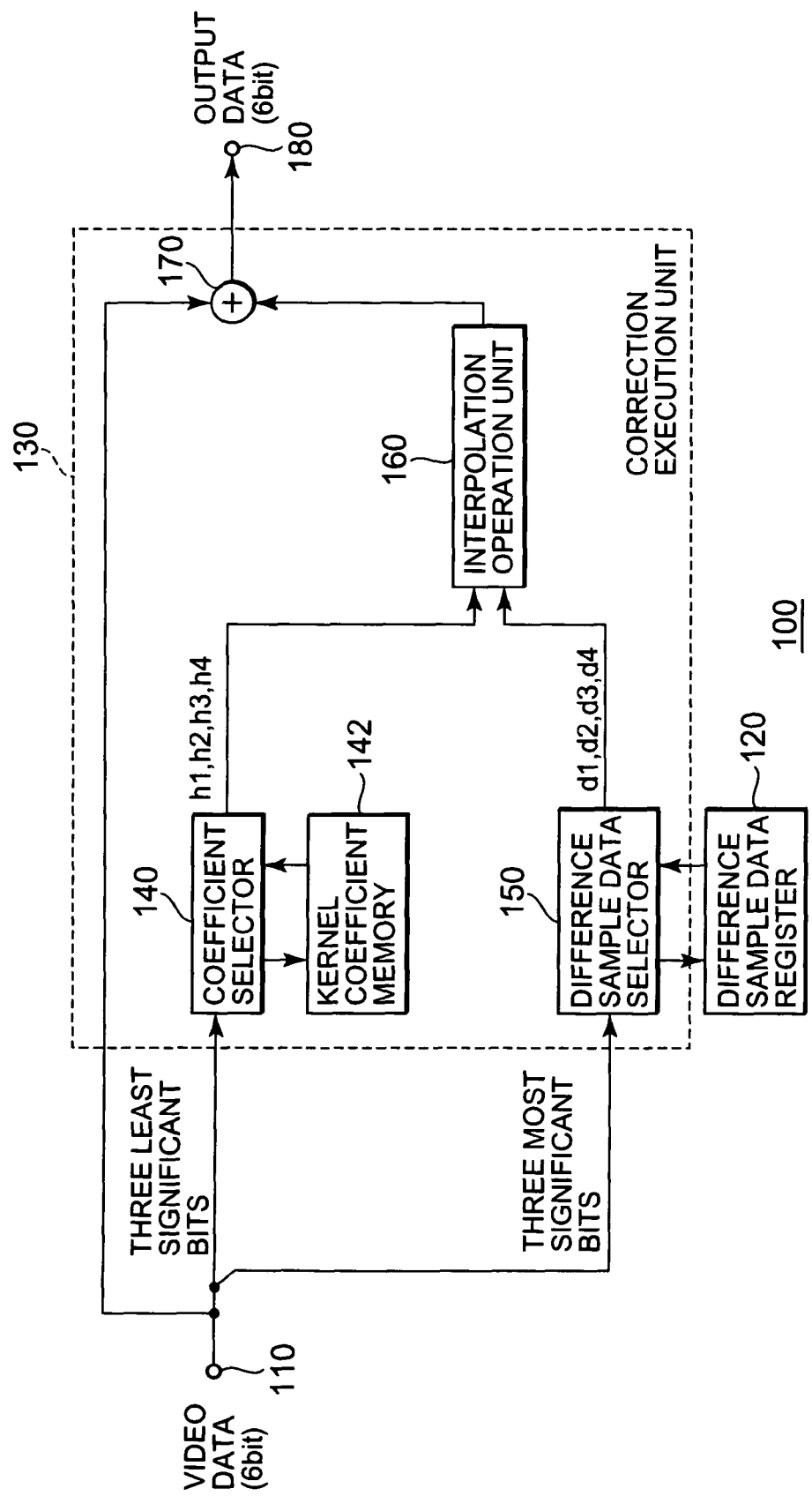
FIG. 1 is a view showing a gamma correction device 100 according to a first exemplary embodiment of the present invention.

FIG. 1 is a schematic view of a gamma correction device 100 according to a first exemplary embodiment of the present invention. The gamma correction device 100 includes a difference sample data register 120, and a correction execution unit 130 that performs gamma correction on video data inputted through an input terminal 110.

The difference sample data register 120 stores a difference between a signal level after the correction and a signal level before the correction, as sample data for each of multiple sample points set equidistantly between permissible minimum and maximum levels of an input video signal. This sample data will be hereinafter referred to as "difference sample data."

Description will be given with reference to FIG. 2 with regard to details of the sample data. Incidentally, in the following description, a "sample point" and an "input level of the sample point" are used with the same meaning.

Figure 2:
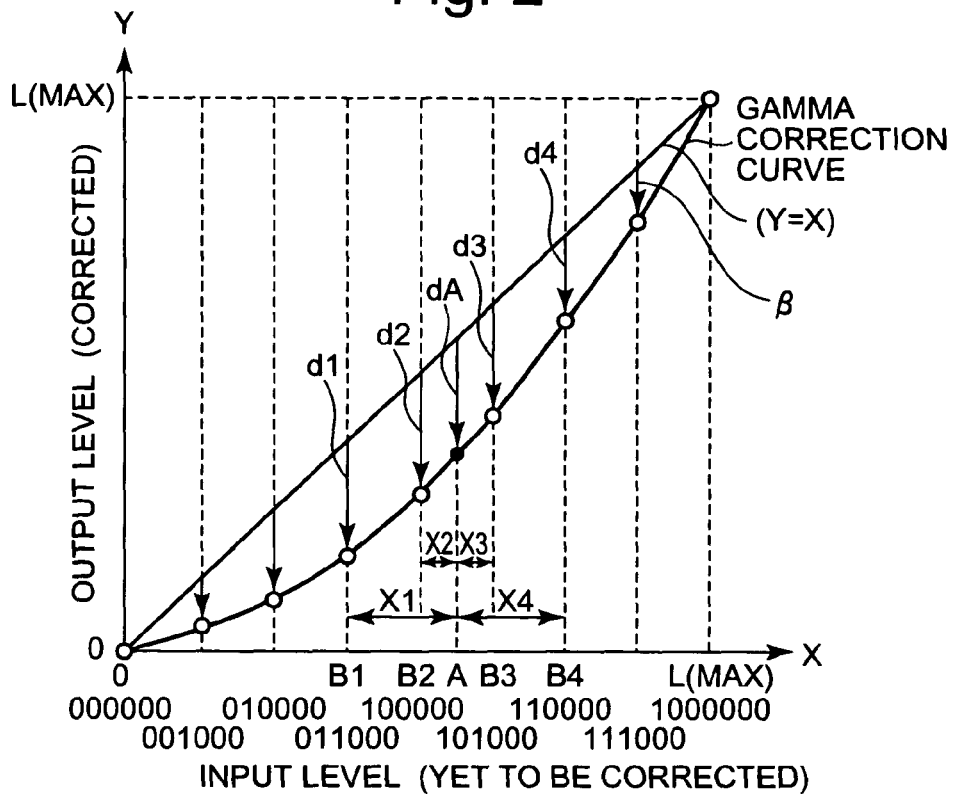
FIG. 2 is a graph for explaining a cubic interpolation operation.

In FIG. 2, the horizontal axis X and the vertical axis Y indicate the signal level before the correction (the input level) and the signal level after the correction (the output level), respectively. L indicates the permissible maximum level of the input video signal. As an example, among the input video signals of 6 bits, the minimum level thereof is "000000," and the maximum level thereof is "111111."

The X and Y values of white circles located on a gamma correction curve satisfy the following Equation (1).

$$(X, Y) = (\text{sample point, output level of sample point}) \quad (1)$$

As an example, assume that the sample points are set by dividing a dynamic range of the input video signal by 3-bit width (000-111). Thus, the number of the sample points will be nine, from 0 to 8, that is, "000000," "001000," "010000," "011000," "100000," "101000," "110000," "111000," and "1000000."

The difference sample data is the difference between the output level of the sample point and the sample point, and is the difference between the output level of the sample point and the Y value on a line Y=X (output level=input level) corresponding to the sample point, as shown by an arrow β of FIG. 2. Hereinafter, this difference will be indicated by d.

The difference sample data register 120 holds the difference d corresponding to each sample point.

The correction execution unit 130 performs cubic operation using the difference sample data, and adds the operated result and the input level of the video signal to obtain the output level of the video signal.

Cubic interpolation operation is an interpolation algorithm using a third-order polynomial equation, and a kernel function h(x) thereof is given as the following Equation (2).

$$h(x) = \begin{cases} (a+2)|x|^3 - (a+3)|x|^2 + 1 & 0 \leq |x| < 1 \\ a|x|^3 - 5a|x|^2 + 8a|x| - 4a & 1 \leq |x| < 2 \\ 0 & 2 \leq |x| \end{cases} \quad (2)$$

Figure 3:
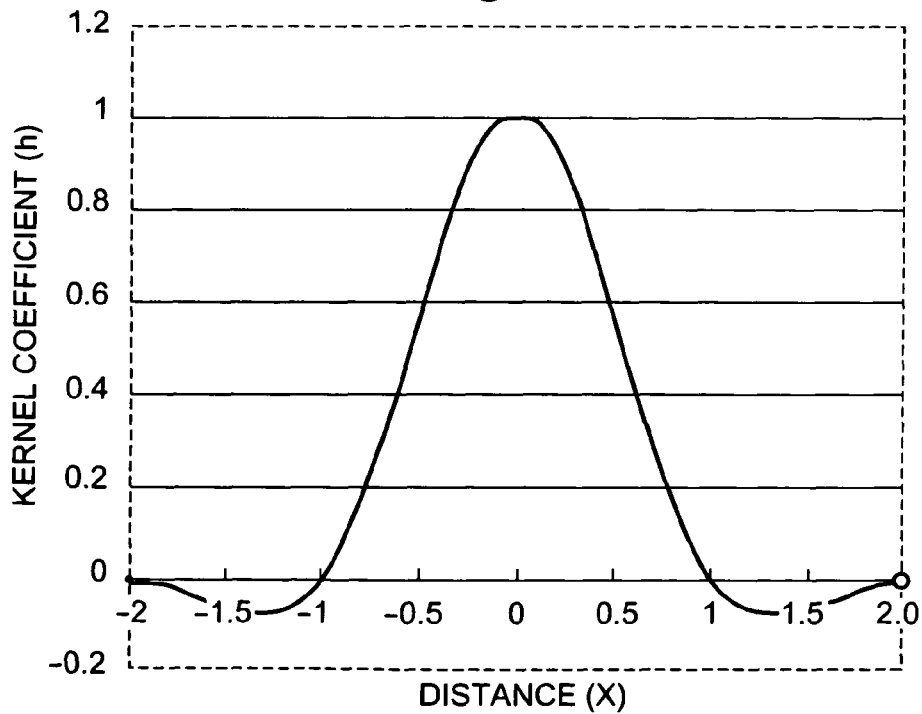
FIG. 3 shows an example of a graph of a kernel function.

In Equation (2), a denotes a constant for controlling a property of an interpolation function, and a value between about −0.5 and −2 is typically used. FIG. 3 is a graph showing the kernel function h(x) represented by Equation (2) when a=−0.5. Incidentally, the value of the kernel function h(x) is called a kernel coefficient.

In Equation (2), "x" represents a distance between the input level of the video signal and the sample point. The sample points required for the cubic operation to obtain the output level at a given input level are composed of one sample point within a distance x range of −2≦x<−1, one within a distance x range of −1≦x<0, one within a distance x range of 0≦x<1, and one within a distance x range of 1≦x<2.

Description will now be given with regard to the correction execution unit 130, taking as an example a process for obtaining the output level at the input level "A" shown in FIG. 2.

The correction execution unit 130 includes a difference sample data selector 150, a kernel coefficient memory 142, a coefficient selector 140, an interpolation operation unit 160, and an adder 170.

The difference sample data selector 150 receives input of the three most significant bits at the input level "A." The difference sample data selector 150 selects difference sample data corresponding to sample points "j−1," "j," "j+1," and "j+2" for the value "j" of 3 bits to be inputted (j denotes a natural number between 0 and 7 inclusive). Specifically, for example, if the input level A is "100011," the value of the three most significant bits is 4. Thus, difference sample data corresponding to the sample points "3" (011000), "4" (100000), "5" (101000), and "6" (110000) are selected. In other words, as shown in FIG. 2, selected for the input level "A" are difference sample data d1 and d2, d3 and d4 corresponding respectively to two sample points B1 and B2 located in the vicinity of "A" with their input levels lower than "A", and to two sample points B3 and B4 located in the vicinity of "A" with their input levels higher than "A." The difference sample data selector 150 outputs the selected four difference sample data pieces to the interpolation operation unit 160.

The interpolation operation unit 160 performs weighting addition on the four difference sample data pieces selected by the difference sample data selector 150, to thereby obtain a difference dA corresponding to the input level "A." A weighting coefficient for this weighting addition is the value of the kernel function h(x) represented by above Equation (2), that is, the kernel coefficient, and is selected from the kernel coefficient memory 142 by the coefficient selector 140.

Figure 4:
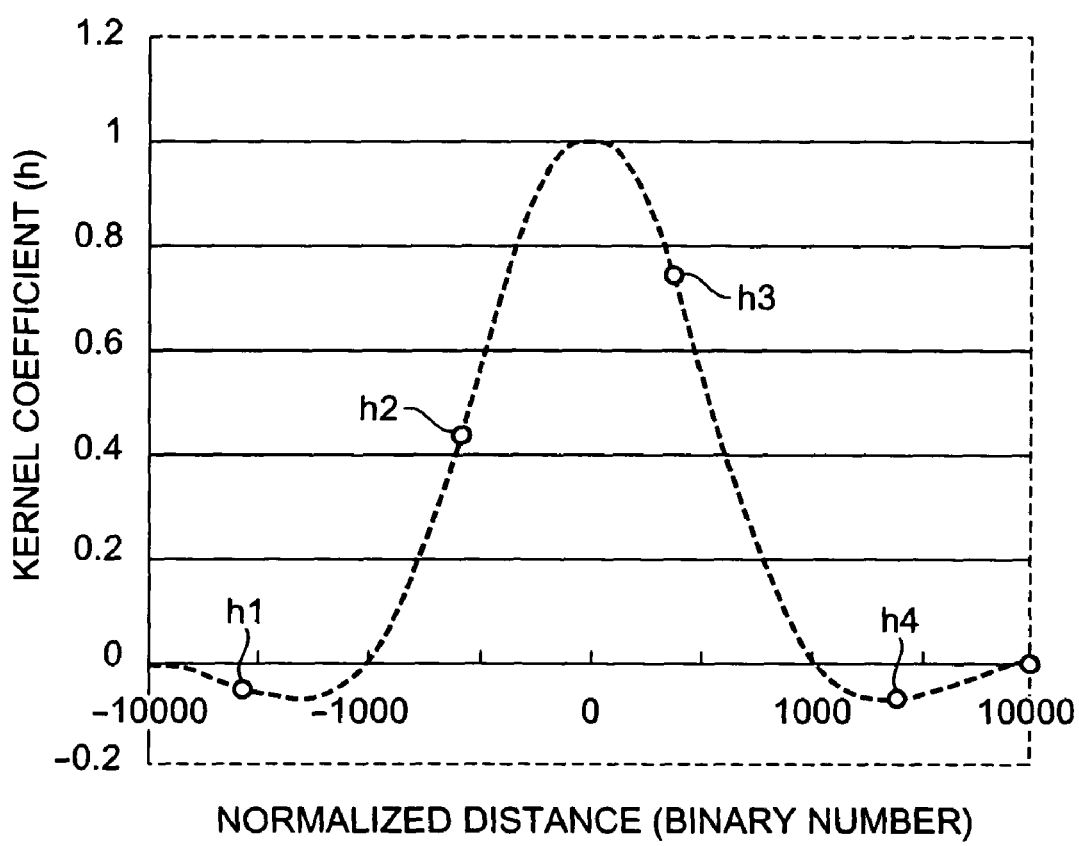
FIG. 4 is a graph for explaining a kernel coefficient stored in a kernel coefficient memory 142 of the gamma correction device 100 shown in FIG. 1.

The kernel coefficient memory 142 stores the value of the kernel function h(x) represented by Equation (2) and x in correspondence with each other. The x value is normalized by the distance between adjacent sample points, 111 (a binary number) as employed herein. Accordingly, the variable x inputted to the kernel function originally takes the range of $-2 \leq x \leq 2$. Thus, if x is normalized by 111 (the binary number), x would take the range of −1000 (a binary number) $\leq x \leq 1000$ (a binary number), as shown in FIG. 4. Incidentally, FIG. 4 also shows the kernel coefficient when a=−0.5.

Also, the kernel coefficients stored in the kernel coefficient memory 142 are obtained for each step in units of quantization bit of the input video signal. Thus, the kernel coefficient memory 142 stores 32 kernel coefficients in total.

The coefficient selector 140 receives input of the three least significant bits at the input level "A." The coefficient selector 140 selects four kernel coefficients h1, h2, h3 and h4 from the kernel coefficient memory 142, and outputs the kernel coefficients to the interpolation operation unit 160. Specifically, the coefficient selector 140 calculates distances x1 to x4 from the input level "A" to the sample points B1 to B4 corresponding to the four difference sample data pieces selected by the difference sample data selector 150 based on the value of 3 bits to be inputted, and selects kernel coefficients h1 to h4 corresponding respectively to the four distances. More specifically, the coefficient selector 140 selects four kernel coefficients, namely, x=(k−16), x=(K−8), x=k, and x=(k+8), for the value k of 3 bits to be inputted (k denotes a natural number between 0 and 7, both inclusive). For example, if the input level "A" is "100011," the value of the three least significant bits is 3. Thus, the kernel coefficients corresponding to the four x values "−13," "−5," "3," and "11" are selected.

The interpolation operation unit 160 performs weighting addition represented by the following Equation (3) on the four difference sample data pieces d1 to d4 selected by the difference sample data selector 150, using as weighting coefficients the four kernel coefficients h1 to h4 selected by the coefficient selector 140.

$$dA = h1 \times d1 + h2 \times d2 + h3 \times d3 + h4 \times d4 \quad (3)$$

The operated result dA of the interpolation operation unit 160 is a difference between the gamma-corrected level of the input level A (the output level) and the input level A, as shown in FIG. 2.

The adder 170 receives input of the input video signal and the operated result of the interpolation operation unit 160. The adder 170 adds the level of the input video signal and the operated result of the interpolation operation unit 160 according to Equation (4), and outputs the added result as output data to an output terminal 180.

$$\text{Output level} = \text{level of input video signal} + dA \quad (4)$$

where dA denotes the operated result of the interpolation operation unit.

In this manner, the gamma correction device 100 of this embodiment obtains the gamma-corrected video signal for the video signal to be inputted.

Consideration will now be made as to the capacity of the difference sample data register 120 in the gamma correction device 100 of this embodiment. Description will be given, taking as an example a case where the gamma correction device 100 of this embodiment is applied to a process for undoing gamma correction made at the transmitting end on a video signal for television broadcasting, what is called inverse gamma correction.

At the receiving end, an inverse gamma correction curve for undoing the gamma correction made at the transmitting end can be represented by the following Equation (5).

$$Y = L \times (X/L)^\gamma \quad (5)$$

where Y denotes the corrected level; X, the yet-to-be-corrected level; L, the maximum value of the input video signal; and γ, the gamma value for inverse gamma correction.

The gamma value γ of a CRT display is typically 2.2, and the gamma value γ of a liquid crystal display (LCD) or a plasma display panel (PDP) is generally in the neighborhood of 2.0 although it varies according to the type of a panel. The gamma value γ for inverse gamma correction in the range of about $1 \leq \gamma \leq 4$ can be used for the inverse gamma correction on the video signal subjected to the gamma correction, at the transmitting end, so that the gamma characteristic of the video signal can match that of these display devices.

In Equation (5), if γ lies between 1 and 4, Equation (6) is satisfied:

$$X - Y = X - L \times (x/L)^\gamma < L/2 \quad (6)$$

where L denotes the maximum value of the input video signal; X, the yet-to-be-corrected level; Y, the corrected level; and γ, the gamma value for inverse gamma correction.

In other words, the yet-to-be-corrected level (the input level) and the corrected level (the output level) are less than ½ of the maximum value of the input video signal.

The difference sample data for use in the gamma correction device 100 is the difference between the sample point and the output level corresponding to the sample point. Accordingly, the setting range can lie between 0 and L/2, as can be seen from Equation (6).

Thus, the bit width of the difference sample data is $\text{Log}_2((L+1)/2)$. On the other hand, as mentioned above, the bit width N of sample data for use in the approach disclosed in Patent Literature 1 is $\text{Log}_2(L+1)$, and thus, the bit width of the difference sample data for use in this embodiment is (N−1). Accordingly, in the first embodiment, 1 bit per sample point can be reduced as compared to the approach disclosed in Patent Literature 1.

Thus, what is necessary for the difference sample data register 120 in the gamma correction device 100 of this embodiment is only to have registers, the number of which corresponds to the bit width of "(N−1)×the number m of sample points." Thus, the difference sample data register 120 can be reduced by m bits, as compared to the sample data register 21 of the gamma correction device 11 shown in FIG. 7.

Also, for the operation represented by Equation (3), the bit width of the difference sample data is (N−1). Thus, assuming that the bit width of the kernel coefficient is set to n, the four multipliers perform multiplication "(N−1) bits×n bits." As a result, the multipliers can each be reduced by 1 bit, and can be reduced by 4 bits in total, as compared to the gamma correction device 11 shown in FIG. 7. Also, three adders that add the four multiplied results can be reduced by 4 bits.

The gamma correction device 100 of this embodiment additionally has the N-bit adder 170, as compared to the gamma correction device 11 shown in FIG. 7. However, the reduction of the multiplier by 1 bit means a left shift of (N−1) bits and the reduction of the adder by (N+n) bits. Thus, it can be seen that the circuit scale can be reduced as compared to the gamma correction device 11 shown in FIG. 7, even in consideration of an increase in the circuit scale caused by the addition of the adder 170.

As described above, the gamma correction device 100 of this embodiment uses for the interpolation operation the difference sample data that is smaller in bit width than the sample data used by the gamma correction device 11 shown in FIG. 7. Thereby, the gamma correction device 100 can reduce the bit width of the register that stores data for interpolation and the circuit scale of the interpolation operation unit, and can reduce an influence upon the number of registers and the circuit scale for the interpolation operation, even if the number of sample points and the bit width of the kernel coefficient is increased for enhancement of the correction accuracy.

Figure 5:
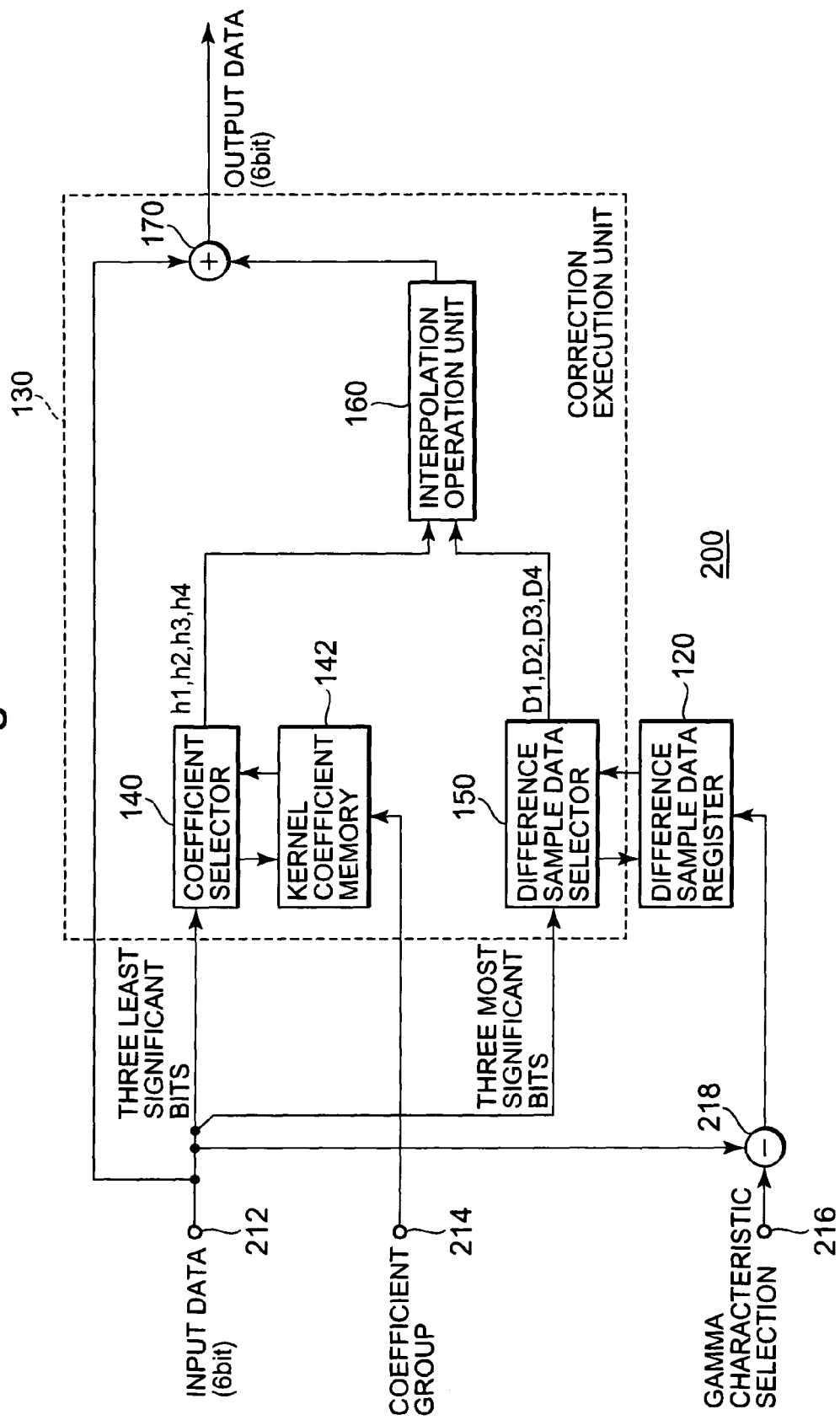
FIG. 5 is a view showing a gamma correction device 200 according to a second exemplary embodiment of the present invention.

FIG. 5 shows a gamma correction device 200 according to a second exemplary embodiment of the present invention. The gamma correction device 200 is capable of selectively correcting multiple gamma values of video signals with different gamma characteristics, and a subtracter 218 is added to the gamma correction device 100 shown in FIG. 1. Note that, in FIG. 5, the structural components having the same functions as those of the gamma correction device 100 shown in FIG. 1 are indicated by the same reference numerals, and detailed description of these structural components will be omitted.

The gamma correction device 200, through a gamma characteristic selector terminal 216, receives input of sample data (the output level of the sample point) for gamma correction such that the gamma characteristic of the video signal can match a desired gamma characteristic. Also, the gamma correction device 200 receives input of the signal level of the sample point through an input terminal 212. The subtracter 218 obtains difference between the signal level of the sample point and the sample data at each sample point, and outputs the difference as difference sample data to the difference sample data register 120. Thereby, the difference sample data for the gamma correction such that the gamma characteristic of the video signal can match the desired gamma characteristic is stored in the difference sample data register 120.

The kernel coefficient memory 142 stores kernel coefficients inputted through a coefficient group input terminal 214.

The correction execution unit 130 performs the gamma correction on the video signal inputted through the input terminal 212. Since this process is the same as the corresponding process by the gamma correction device 100 shown in FIG. 1, description thereof will be omitted.

Although the gamma correction device 200 of this embodiment has the subtracter 218 and the adder 170 added thereto as compared to the gamma correction device 11 shown in FIG. 7, the bit reduction of the multiplier of the interpolation operation unit 160 enables reduction in the circuit scale as compared to the gamma correction device 11 shown in FIG. 7 even if an amount of an increase in the circuit scale caused by the addition of the subtracter 218 and the adder 170 is deducted, as in the case of the gamma correction device 100 shown in FIG. 1.

Figure 6:
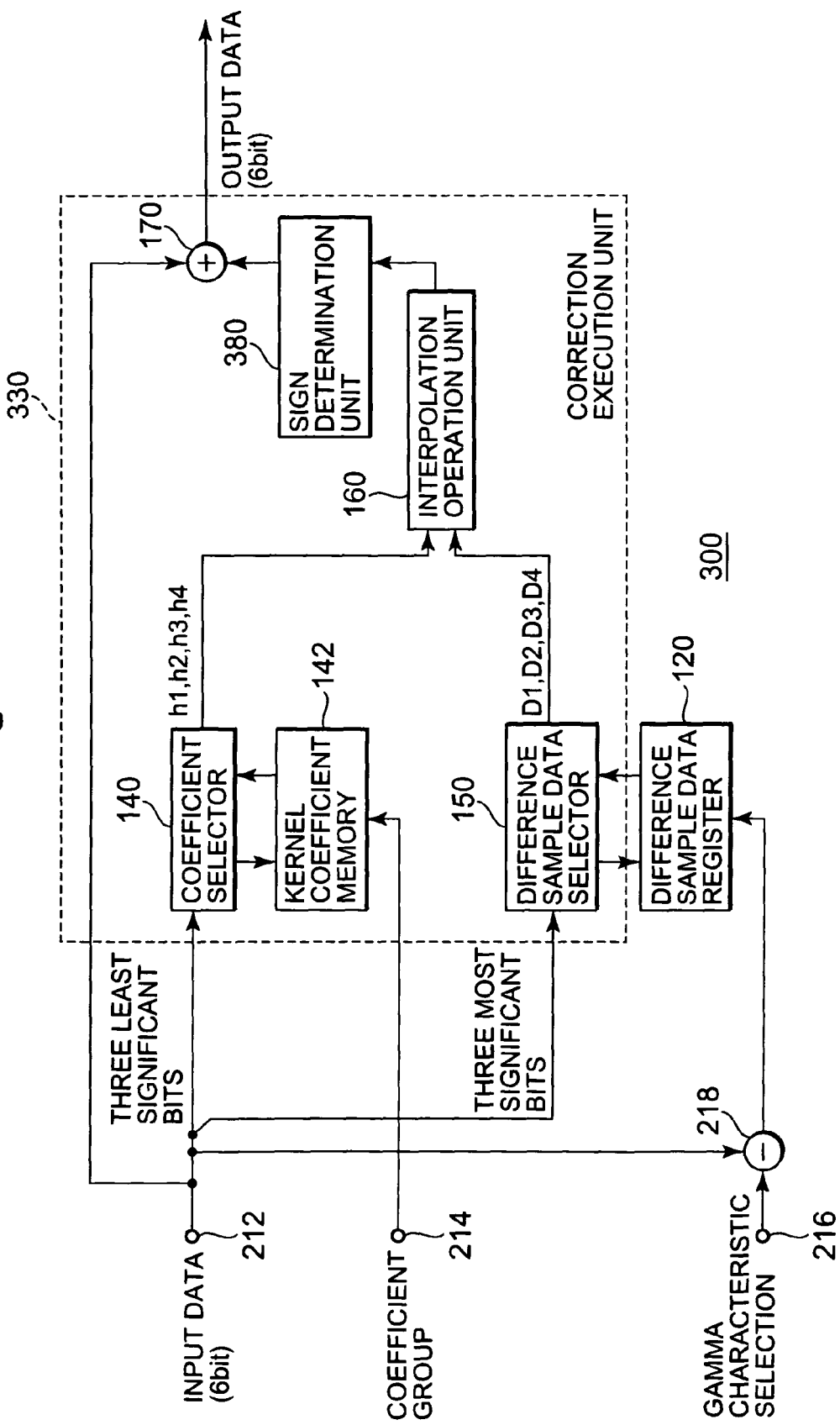
FIG. 6 is a view showing a gamma correction device 300 according to a third exemplary embodiment of the present invention.

FIG. 6 shows a gamma correction device 300 according to a third exemplary embodiment of the present invention. Description will now be given mainly with regard to a sign determination unit 380, since the gamma correction device 300 is the same as the gamma correction device 200 except that a correction execution unit 330 has added thereto the sign determination unit 380 interposed between the interpolation operation unit 160 and the adder 170 of the correction execution unit 130 of the gamma correction device 200 shown in FIG. 5.

Gamma correction has two types: hard tone correction for correcting the video signal to produce a hard tone; and soft tone correction for correcting the video signal to produce a soft tone. For the hard tone correction, the gamma correction curve is located above a straight line represented by "output level=input level," that is, "Y=X," while for the soft tone correction, the gamma correction curve is located under this straight line. The gamma correction curve (shown in FIG. 2) used in the description of the gamma correction device 100 and the gamma correction device 200 mentioned above is an example of that for the soft tone correction. Incidentally, the inverse gamma correction for undoing the gamma correction made on the video signal and for matching the gamma characteristic of the video signal with that of the CRT display corresponds to the soft tone correction.

The approach of assigning a sign to the difference sample data stored in the difference sample data register can be employed in order that the gamma correction device 100 and the gamma correction device 200 can correspond to both the hard tone correction and the soft tone correction. The gamma correction device 300 of this embodiment is provided with the sign determination unit 380 so as not to cause the difference sample data to have a sign bit before the completion of the interpolation operation by the interpolation operation unit 160.

Specifically, for the hard tone correction, the sign determination unit 380 assigns the sign "+" to the operated result of the interpolation operation unit 160 and outputs the result to the adder 170, while for the soft tone correction, the sign determination unit 380 assigns the sign "−" to the operated result of the interpolation operation unit 160 and outputs the result to the adder 170.

If the sign is assigned to the difference sample data, then the difference sample data register 120 also requires the sign bit, and is increased by m bits for the number of sample points. Also, the interpolation operation unit 160 is increased by 1 bit per multiplier and is hence increased by 4 bits in total for 4 multipliers. Likewise, the adder of the interpolation operation unit 160 is increased by 4 bits. As mentioned above, an increase in bit of the multiplier has a great influence on an increase in the circuit scale. Thus, the gamma correction device 300 of this embodiment can suppress the increase in the circuit scale, when it is desired to correspond to both the hard tone correction and the soft tone correction.

Description has been given above with regard to gamma correction techniques of the present invention based on the embodiments. It should be understood that the embodiments are for purpose of illustration and that various changes may be made without departing from the spirit and scope of the present invention. It will be understood by those skilled in the art that modifications having these changes made therein may be included within the scope of the present invention.

Further, it is noted that Applicant's intent is to encompass equivalents of all claim elements, even if amended later during prosecution.

What is claimed is:

1. A signal processing apparatus, comprising:
a coefficient selector which selects a group of kernel coefficients among a plurality of kernel coefficients based on a first portion of a video data;
a difference sample data selector which selects a group of difference sample data among a plurality of difference sample data based on a second portion of the video data;
an interpolation operation unit which performs a cubic interpolation operation based on the group of kernel coefficients and the group of difference sample data to produce an interpolation data;
an adder which adds the video data with the interpolation data to produce a gamma correction video signal; and
a sign determination unit which adds the interpolation data with a sign of a positive value in a first correction mode and adds the interpolation data with a sign of a negative value in a second correction mode,
wherein the adder receives the interpolation data added with the sign as the interpolation data.

2. The signal processing apparatus as claimed in claim 1, wherein the kernel coefficients are obtained in units of a quantization bit of the video data.

3. The signal processing apparatus as claimed in claim 1, further comprising a kernel coefficient memory.

4. The signal processing apparatus as claimed in claim 3, wherein the plurality of kernel coefficients is stored in the kernel coefficient memory.

5. A signal processing apparatus for performing a gamma correction on an input video signal, said signal processing apparatus comprising:
a difference sample data holder which holds, as difference sample data, a difference between a corrected signal level and a yet-to-be-corrected signal level for each of a plurality of sample points set at equal intervals between permissible minimum and maximum levels of the input video signal; and
a correction execution unit which performs a cubic interpolation operation using the difference sample data held in the difference sample data holder, and adds an operated result of the cubic interpolation operation and a signal level of the input video signal to obtain a signal level of a corrected video signal, wherein:
the correction execution unit includes a sign determination unit that assigns a sign to the operated result of the cubic interpolation operation, the sign depending on whether the gamma correction comprises a hard tone correction for correcting the input video signal to produce a hard tone or a soft tone correction for correcting the input video signal to produce a soft tone,
the correction execution unit adds the operated result, having the sign assigned by the sign determination unit, to the signal level of the input video signal, and
wherein the sign determination unit assigns a positive sign to the operated result when the gamma correction comprises the hard tone correction for correcting the input video signal.

6. The signal processing apparatus as claimed in claim 5, wherein the sign determination unit assigns a negative sign to the operated result when the gamma correction comprises the soft tone correction for correcting the input video signal.

7. A signal processing apparatus for performing a gamma correction on an input video signal, said signal processing apparatus comprising:
a difference sample data holder which holds as difference sample data, a difference between a corrected signal level and a vet-to-be-corrected signal level for each of a plurality of sample points set at equal intervals between permissible minimum and maximum levels of the input video signal; and
a correction execution unit which performs a cubic interpolation operation using the difference sample data held in the difference sample data holder, and adds an operated result of the cubic interpolation operation and a signal level of the input video signal to obtain a signal level of a corrected video signal,
wherein a value of the corrected signal level is less than one half of a maximum value of the input video signal.

8. The signal processing apparatus as claimed in claim 7, wherein a value of the yet-to-be corrected signal level is less than one half of a maximum value of the input video signal.

* * * * *